United States Patent [19]

Leas et al.

[11] 3,801,288

[45] Apr. 2, 1974

[54] GASIFICATION REACTOR

[75] Inventors: Lawrence E. Leas, Simi, Calif.; Robert L. Leas; Cecil J. Johnson, both of Columbia City, Ind.

[73] Assignee: Leas Brothers Development Corporation, Columbia City, Ind.

[22] Filed: July 13, 1971

[21] Appl. No.: 162,180

[52] U.S. Cl. ................ 23/288 R, 23/283, 23/284, 23/277 R, 48/197, 48/212, 252/373
[51] Int. Cl. ............................................. B01j 9/04
[58] Field of Search ...... 23/283, 284, 288 R, 288 S, 23/289, 1 FT, 277; 48/196, 197, 203, 212, 85; 252/373

[56] References Cited
UNITED STATES PATENTS

| | | | |
|---|---|---|---|
| 1,505,065 | 8/1924 | West et al. | 23/212 A |
| 2,327,746 | 8/1943 | Shultz | 252/416 X |
| 2,700,598 | 1/1955 | Odell | 48/196 R |
| 2,532,514 | 12/1950 | Phinney | 23/288 K X |
| 3,669,877 | 6/1972 | Friedrich | 23/288 S X |

*Primary Examiner*—James H. Tayman, Jr.
*Attorney, Agent, or Firm*—Edward E. Dyson; John J. Byrne

[57] ABSTRACT

A reactor for use in gasifying carbonaceous materials comprising inner and outer shells defining concentric chambers, one to be filled with a metal oxide for producing and heating gases to be used in the gasification process, and the other to be filled with the carbonaceous material to be gasified. The inner shell includes passageway means in the lower portion thereof communicating two chambers. The inner and outer shells are comprised of spaced walls having heat exchange fluid conduits disposed therein whereby the temperature within the chambers can be controlled within certain limits.

6 Claims, 4 Drawing Figures

GASIFICATION REACTOR

This invention relates to a reactor and more particularly to a reactor for use in gasifying coke, coal or other carbonaceous materials either in solid particulate or slurry form.

The reactor of this invention is particularly useful in gasification systems wherein heated carbon dioxide is reacted with the carbon to produce carbon monoxide, which is then desulfurized or otherwise treated. The reaction in the gasifier between carbon dioxide and carbon is endothermic, and in order to supply or replenish the lost heat and maintain the temperature of the carbonaceous bed at the desired temperature level, the gasification operation generally must be performed in cycles such that carbon monoxide is produced in one cycle while in another cycle air is introduced into the carbonaceous bed in an air-burn operation to heat the carbonaceous bed back to the desired temperature level. By using two gasifiers, the process can be rendered continuous with one gasifier being in the air-burn cycle while the other is in carbon monoxide production cycle. In this invention a portion of the carbon monoxide produced in the production stage is recycled through a metal oxide bed wherein the carbon monoxide is reacted with the metal oxide in a exothermic reaction to produce heated carbon dioxide. The carbon dioxide is then introduced into the carbonaceous bed to produce additional carbon monoxide in approximately a two-to-one ratio with regard to the amount of carbon monoxide originally introduced into the metal oxide bed. A metal typically used is cobalt although it is to be understood that any metal having similar oxidation and reduction values may be used.

In the prior art, the metal oxide bed, used to produce heated carbon dioxide, and the bed of carbonaceous materials generally are maintained in separate reactors, requiring transport conduits and various connections between the two reactors. Consequently, there is a substantial amount of heat loss in transporting the gases from one reactor to another which affects the overall output of the gasifier.

It is an objective of this invention to provide a reactor for use in a gasification process wherein heat losses are minimized and the efficiency of production are maximized.

It is a further objective of this invention to provide means for effectively controlling the reaction temperatures.

These objectives are realized by providing a reactor tower comprising inner and outer concentric cylindrical shells defining an inner central chamber and an outer annular chamber the latter of which receives the above-referred-to metal oxide and the former receives the carbonaceous materials to be gasified. The tower is sealed for the maintenance of optimum operating pressures, and is provided with ingress and egress ports for the introduction of the various materials and gases, and for the taking off of ashes and product gases. The inner shell is provided with passageway means in its lower portion thereof communicating the outer annular chamber and the central chamber, whereby, in the production cycle, carbon monoxide is introduced into the metal oxide bed in the annular chamber, which is in its higher oxide form. The carbon monoxide reduces the metal oxide to a metal and/or lower oxide in an exothermic reaction forming carbon dioxide, which travels through said passageway means into the lower portion of the carbonaceous bed into the central chamber passing upwardly through the carbonaceous materials gaifying the carbon therein to carbon monoxide which is taken off at the top of the reactor. The air introduced during the air-burn stage follows the same path oxidizing the metal and/or lower oxide back to its higher oxide form. An excess amount of air is introduced such that a substantial portion enters the gasifier for the air-burn stage to reheat the carbonaceous bed.

Optimum heat conservation is realized because of the contiguous chambers sharing common walls and eliminating the need for connecting conduits or the like. Additionally, heat exchanger conduits are provided in the walls of the inner and outer shells for purposes of controlling the temperature within the chambers within certain limits. The walls themselves are defined by spaced walls with the heat exchanger conduits being disposed in the space therebetween.

In modified form of this invention, the reactor tower is provided with a diametrically extending plate extending throughout the vertical length of the tower and dividing the inner central chamber and the outer annular chamber into equal halves such that, while one half of the reactor is in the carbon monoxide production stage, the other half of the reactor is in the air-burn stage thereby rendering the total process continuous in operation.

These and other objects of the invention will become more apparent to those skilled in the art by reference to the following detailed description when viewed in light of the accompanying drawings wherein.

Figures 1, 2:
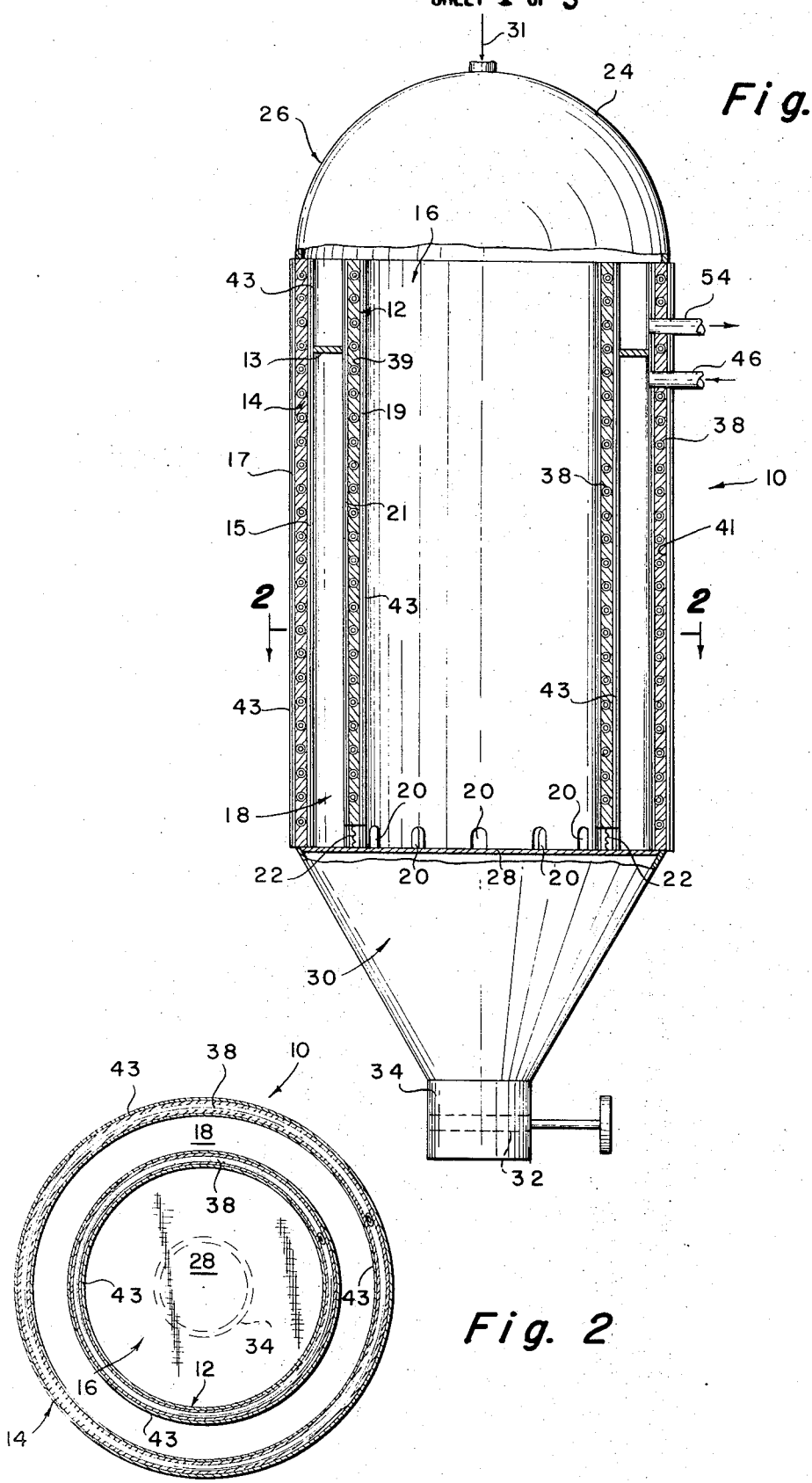
FIG. 1 is a partial cross sectional view of the reactor of this invention.
FIG. 2 is a cross sectional view taken on lines 2—2 of FIG. 1.

Referring now to the drawings wherein like numerals indicate like parts, the reactor of this invention as shown in FIG. 1 is generally indicated by the numeral 10 and includes an inner cylindrical shell 12 and an outer cylindrical shell 14 defining a central chamber 16 and a concentric outer chamber 18. The chambers communicate with each other via passageways 20 in the lower portion of the inner shell 12, spaced around the periphery thereof. If desired, a screen 22 may be placed within each opening to prevent material within the two chambers from co-mingling while permitting the passage of gases therethrough. The upper portion of the chamber 18 is separated from the lower cobalt oxide containing portion thereof by means of an annular baffle plate 13.

The inner and outer shells are each comprised of a spaced wall construction with a heat exchange conduit being disposed in the space between the walls. The shell 14 is defined by inner and outer walls 15 and 17 and the inner shell 12 by inner and outer walls 19 and 21. Heat exchange conduits 38 are disposed in the spaces 39 and 41 of the inner and outer shells respectively. Each of the wall surfaces are lined with a refractory material 43 capable of withstanding the high temperatures during operation.

The reactor tower comprises a closed hood 24 defining a head space 26 above the chambers 16 and 18. A grate or other foraminous support 28 defines the bottom wall of the chambers and permits ashes to fall therethrough to the ash collecting chamber 30. The ash may periodically be discharged through gate 32 in the spout portion 34 of the reactor tower. The reactor is substantially airtight to permit the buildup and maintenance of pressures at the desired level within the reactor during the operation thereof. The reactor generally operates with pressures in the range of 10 to 1,000 psi.

Figure 3:
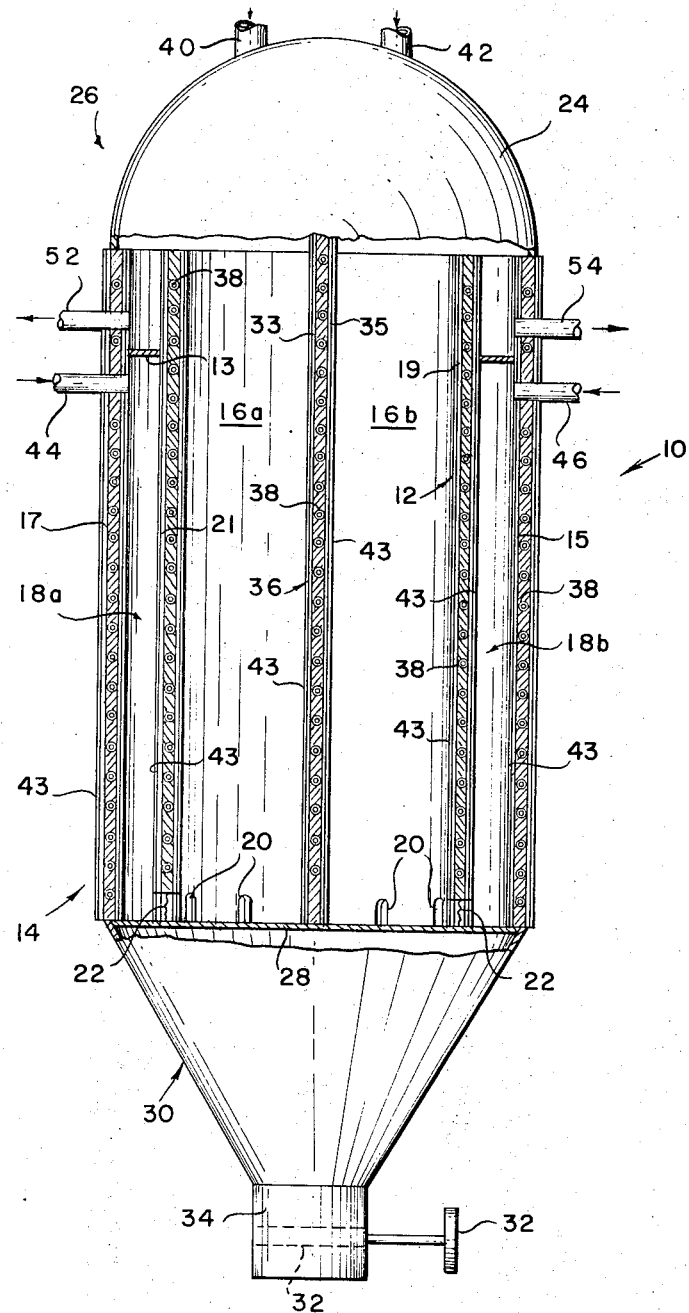
FIG. 3 is a partial cross sectional view of a modified form of the reactor of this invention.
Figure 4:
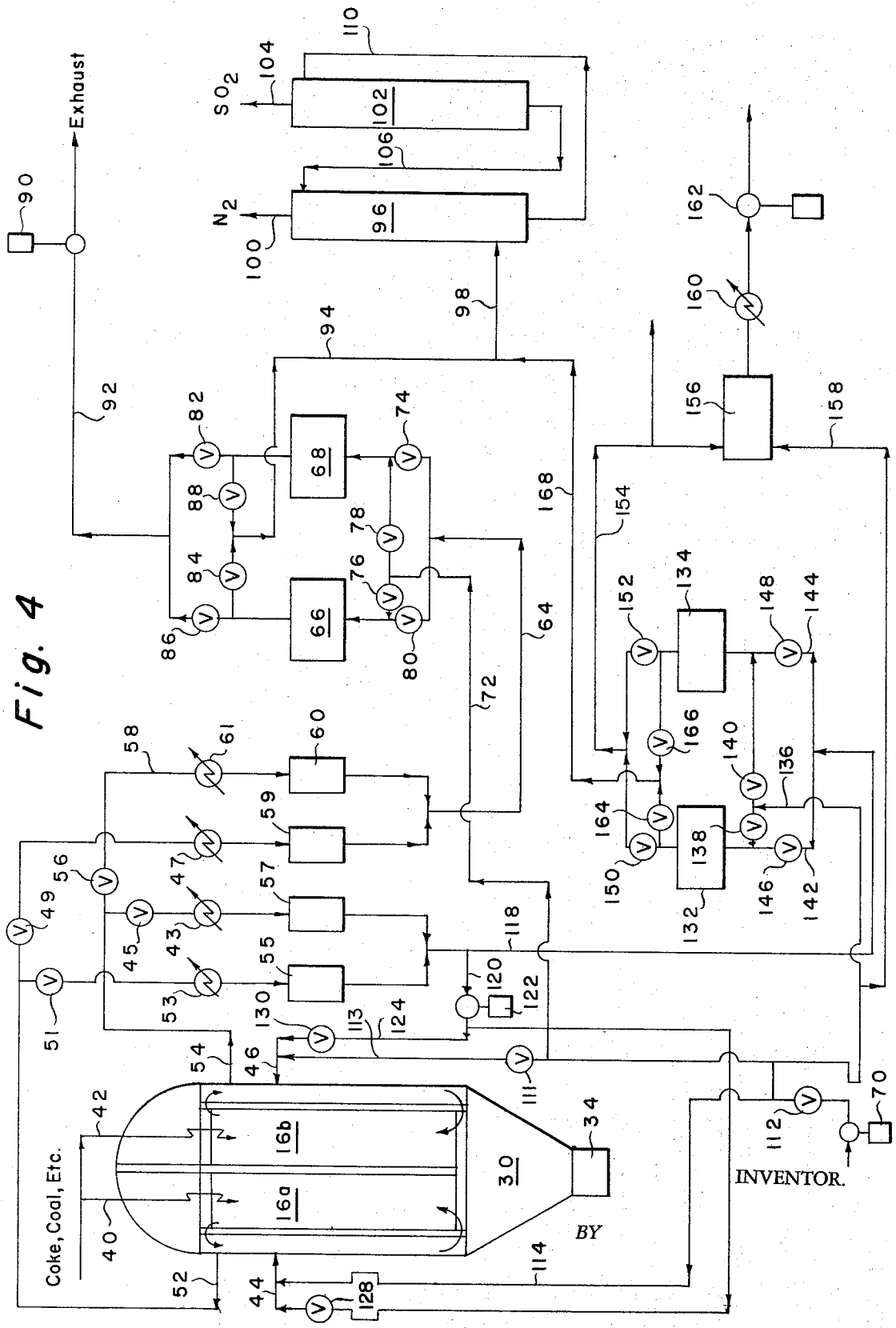
FIG. 4 is a diagrammatic illustration of a gasification process employing the reactor of this invention.

A modified form of the reactor of this invention is shown in FIG. 3. A diametrically extending divided plate 36 extends from the plate 28 of the reactor to the underside of the top hood 24 and divides the central chamber into semi-circular chambers 16a and 16b of equal size. The plate also divides the outer annular chamber into chambers 18a and 18b also of equal size. The purpose of this plate is to render the total gasification process continuous with the use of a single reactor tower. The plate is comprised of spaced walls 33 and 35 having exchange conduits 38 therebetween. The plate is also lined with a refractory material 43.

As mentioned, the inner and outer shells and the divider plate 36 are lined with a refractory material suitable for withstanding tmperatures of up to 2500°F., and are provided with conduits 38 interiorly thereof for receiving a heat exchange fluid. The heat exchange fluid is continuously passed through the conduits in the walls for lending some control to the reaction temperatures within the chambers. The heat exchange fluid as it leaves the reactor is transferred to an outside heat exchanger where the heat therein is given up for other uses.

The central chamber 16 is filled with coke, coal or other carbonaceous materials either in solid particulate form or slurry form by means of a feed line in the top portion of the reactor diagrammatically indicated by the numeral 31, while the outer chamber 18 is filled with cobalt oxide. An inlet conduit 46 is provided for the chamber 18 and conduit 54 is provided for taking off gases from the reactor.

In the modified embodiment of FIG. 3, the central chamber 16 which is divided into half chambers 16a and 16b is filled with coke, coal or other carbonaceous materials, either in solid particulate form or slurry form by means of feed lines in the top portion of the reactor which are schematically illustrated at 40 and 42, while outer half chambers 18a and 18b are filled with cobalt oxide introduced to chambers 18a and 18b through inlet conduits 44 and 46 respectively. The conduits 44, 46, 52 and 54 are used for introducing and taking off gases from the reactor.

The operation of the reactor of this invention will be described with respect to a complete gasification process for the recovery of carbon monoxide and incidental product gases as diagrammatically illustrated in FIG. 3. This illustrative process will be described using the modified reactor of FIG. 3, which permits continuous operation. It is to be understood that the two reactors of the embodiment of FIG. 1, not having a divider plate, may be used to render the operation continuous. Cobalt oxide is introduced to chambers 18a and 18b by means of infeeds 44 and 46 while chambers 16a and 16b are replenished with coke, coal or other carbonaceous materials by means of infeed lines 40 and 42. For purposes of illustration, the part of the reactor including chambers 16b and 18b will be described as being in the carbon monoxide production cycle while the side of the reactor including chambers 16a and 18a will be described as being in the regenerative or air-burn cycle. In this condition, the cobalt in the chamber 18b will be in its higher oxide form.

The reactor is started up by charging chamber 18b with carbon monoxide via line 46. The carbon monoxide passes downwardly through the higher oxide form of the cobalt oxide and reduces it to a metal and/or lower oxide in an exothermic reaction producing heated carbon dioxide. The carbon dioxide enters the gasifier chamber 16b via passageways 20 and reacts with the carbon therein to produce carbon monoxide in the reaction $CO_2 + C \rightarrow 2CO$. The carbon monoxide so produced exits from the top of the chamber 16b and leaves the reactor through line 54. The amount of carbonaceous materials and cobalt oxide is such that in a preferred embodiment, for every one part of carbon monoxide introduced into the chamber 18b, essentially two parts are produced in the gasifier section in chamber 16b. The carbon monoxide enriched gases leave the reactor via line 54 and travel through open valve 45, and heat exchanger 43 to high temperature filter 57. The heat exchanger cools the gases somewhat prior to entering the filter.

The filtered carbon monoxide enriched gases exit from either the high temperature filter 55 or 57 depending upon which cycle the process is in via line 118, at which point a portion of the carbon monoxide is taken off via line 120 and is compressed into compressor 122 for recycle back to either the reactor 18b via line 124 and valve 130 or the reactor 18a via line 126 and valve 128 respectively. After startup, the recycled carbon monoxide comprises substantially the total amount injected into the chamber 18b during the production stage. The rate of production and the amount thereof of carbon monoxide is dependent upon the rate of introduction of the carbonaceous materials to the beds 16a or 16b.

The remaining carbon monoxide gases are introduced to a desulfurizer comprising cobalt oxide beds 132 and 134 which react with the sulfur in the gases to cobalt sulfide, thereby removing the sulfur from the gases. The beds are used alternately such that, while one is removing sulfur contaminants from the carbon monoxide rich gases, and being reduced to a lower oxide form or a metal, the other bed is being oxidized by air introduced via line 136, and by either valve 138 or valve 140 depending on which bed is being regenerated. The carbon monoxide enriched gases are introduced into the beds 132 and 134 via line 142 and line 144, and valves 146 and 148 respectively. The desulfurized carbon monoxide gases are taken off through valves 150 and 152 and through line 154 to a combustor 156 wherein heated air under pressure is introduced via line 158 for combustion with the carbon monoxide. The exhaust gases therefrom are passed through heat exchanger 160 and expanded through a power wheel 162, which can be used for the generation of electricity. The gases are then exhausted to the atmosphere. During the air regeneration phase, the cobalt sulfide within the cobalt beds 132 and 134 is liberated as sulfur dioxide and is entrained in the nitrogen enriched gases through valves 164 and 166 and through line 168 and line 98 to the sulfur dioxide absorber 96 for the removal of the sulfur dioxide from the gases. Nitrogen is taken off at 100 while the sulfur dioxide and absorbent leave the absorber 96 and enter stripper 102, via line 110, wherein the sulfur dioxide is removed and taken off at 104. The absorbent is recycled back to absorber 96 via line 106

The above traces the process steps of the gasifier section 16b during the carbon monoxide production stage. Simultaneously therewith, the carbonaceous materials in chamber 16a are being subjected to the air-burn stage wherein air is being pumped by means of compressor 70 through valve 112 and line 114 to the cobalt oxide bed in chamber 18a which in the preceding production cycle had been reduced by the introduction of carbon monoxide. An excess amount of air is introduced and reacts with the cobalt metal and/or lower form oxide to oxidize it back to its higher oxide form and in the process exothermically heats the air. Since an excess amount of air is introduced, not all of the oxygen therein reacts with the cobalt oxide, and the oxygen therein not consumed is used to burn the carbonaceous material to the higher temperature. The gases comprising mostly nitrogen and some carbon dioxide as well as sulfur contaminants are taken off through line 52 and introduced to higher temperature filter 59 via open valve 49 and heat exchanger 47. Four high temperature filters 55, 57, 59 and 60 are provided as shown. As just mentioned, during the air-burn stage, for bed 16a, the gaseous products therefrom are introduced to filter 59. During the production stage of chamber 16a, the valve 49 is closed and the valve 51 is opened and the carbon monoxide enriched gases are introduced to the high temperature filter 55 through heat exchanger 53, and are then introduced to a desulfurizing unit. During the airburn stage of the carbonaceous bed of chamber 16b, air is introduced via valve 111 and 113 to chamber 18b and flows to chamber 16b. Valve 45 is closed and the valve 56 is opened, and the gases are introduced to the high temperature filter 60 through heat exchanger 61. The gases exit therefrom and are passed to a cobalt oxide desulfurizing unit via line 64. The desulfurizing unit comprises cobalt oxide beds 66 and 68 which are alternately operable to provide a continuous desulfurizing system. While one bed is being reduced and sulfur is being removed from the gases from the gasifier, the other bed is being oxidized by air from compressor 70 in line 72. Assuming the bed 68 is in the desulfurizing or reduction phase and bed 66 is in the oxidizing or regenerative phase, valves 74 and 76 are open and valves 78 and 80 are closed meaning that air is being introduced into reactor 66 to oxidize the cobalt metal and/or lower form of cobalt oxide therein back to its higher oxide form and gases from the reactor, primarily nitrogen and carbon dioxide, are being introduced into the bed 68. The higher form of cobalt oxide in bed 68 is reduced to a lower form of cobalt metal and/or a lower form of cobalt oxide and the sulfur in the gases forms a cobalt sulfide and is thereby removed from the gases. On the egress side of the reactors, valve 82 and valve 84 are open and valves 86 and 88 are closed. The desulfurized gases are transported to power wheel 90 via line 92 and then exhausted to atmosphere. The air which is introduced to the reactor 66 not only oxidizes the cobalt oxide back to its higher oxide form but also liberates the sulfur therein as sulfur dioxide. The gases exiting from the reactor 66 comprise primarily nitrogen and sulfur dioxide. These gases exit through open valve 84 and line 94 and are introduced to a sulfur dioxide absorber 96 through line 98, wherein a suitable absorbent absorbs the sulfur dioxide in the gases and the nitrogen is vented to the atmosphere or sent to storage as desired via line 100. The absorbent and the absorbed sulfur dioxide leaves the absorber 96 and is introduced to stripper 102 via line 110. In the stripper, the $SO_2$ is removed from the absorbent and vented to the atmosphere or otherwise sent to storage via line 104. The stripped absorbent is then recycled back to the absorber 96 via line 106.

The above process with which the gasifier of this invention may be used is merely illustrative of a number of processes in which the reactor of this invention is useful.

Examples of gasification processes using the concentric chamber gasifier of this invention are as follows:

EXAMPLE I 2.5 lbs./hr. of coke (low sulfur) with weight analysis of 88 per cent carbon, 1 per cent hydrogen, 1.6 per cent nitrogen, 0.8 per cent sulfur, 2.4 per cent oxygen and 6.2 per cent ash were fed into one side of the gasifier during the air feed cycle. The gasifier was maintained at approximately 300 psi and 2000°F. with cooling. The cobalt oxide reactor was on the outside of the gasifier between the gasifier and outside wall. The lower form of cobalt oxide (CoO) was inside the reactor since it had been reduced and purged with nitrogen. This reactor was maintained at approximately 2000°F at 300 psia. Ash was allowed to accumulate in the bottom of the gasifier during this run but on a large commercial scale, the ash would be discharged during operation. 65 lbs./hr. of air at 800°F. was fed into the cobalt oxide reactor and the oxide was oxidized to the higher oxide. The air and nitrogen were preheated and entered the bottom of the gasifier from the bottom of the cobalt oxide reactor. The coke was burned with air and exited from the top of the reactor at a rate of 59.9 lbs./hr. with a nitrogen content of 79.8 per cent and a sulfur content of 480 ppm measured as sulfur. These concentrations are wt. basis. The gases were cooled from 2000°F. to 1100°F. in a heat exchanger and sent to a cobalt oxide reactor for desulfurization. After desulfurization, the sulfur content was 52 ppm based on sulfur. The exhaust gases were cooled and exhausted to the atmosphere but in actual operation, the gases would be expanded through a gas turbine or other gas power wheel for power generation.

During this period 12.2 lbs./hr. of this same type coke was fed to the gasifier on the opposite side. This gasifier was maintained at approximately 300 psia and 2000°F. The cobalt reactor for this gasifier (same design) contained the higher form of cobalt oxide ($Co_3O_4$) since it had been oxidized with air. 23.4 lbs./hr. of gases with a carbon monoxide concentration of 72 per cent (wt.) were fed into the cobalt oxide reactor, maintained at approximately 2000°F. and 300 psia. The carbon monoxide reduced the higher oxides and was oxidized to carbon dioxide and entered the bottom of the gasifier from the bottom of the cobalt oxide reactor. 40.2 lbs./hr. of gases with an average carbon monoxide concentration of 73 per cent (wt.) and a sulfur concentration of 2500 ppm (measured as sulfur) exited the top of the gasifier. The gases were cooled to 1100°F. and sent to another cobalt oxide desulfurizer and exited at a carbon monoxide concentration of 72 per cent (wt.) with a sulfur content of 72 ppm. 23.4 lbs./hr. was recycled and the remaining gases were burned with excess air, cooled and exhausted to the atmosphere. In actual practice these gases would also be expanded through a gas power wheel, turbine, etc. for power recovery before being exhausted to the atmosphere.

After desulfurization, the sulfur was removed from the cobalt oxide reactor via air oxidation to sulfur dioxide, the exit stream passed through an absorber and stripper and 0.215 lbs./hr. of sulfur dioxide was recovered.

EXAMPLE II

The system was operated at essentially under the same conditions except pressure was maintained at approximately 50 psia. There were essentially no differences in results obtained but in actual practice the power recovery would vary with system pressure.

EXAMPLE III

The system was operated at about the same conditions as in Example I except pressure was maintained at approximately 500 psia. The only real difference was that the carbon monoxide concentration out of the gasifier was lower by approximately 7 per cent.

We claim:

1. An apparatus for producing carbon monoxide comprising,
    a reactor, said reactor including inner and outer shells defining an inner central chamber and an outer annular chamber respectively,
    the outer annular chamber including a fixed bed of cobalt oxide and said inner chamber including a fixed bed of carbonaceous material,
    an inlet passageway to said outer annular chamber, at least one internal passageway for communicating the lower portion of said outer annular chamber with the lower portion of said central chamber and an outlet passageway for said central chamber,
    a baffle means extending across said outer annular chamber and dividing said inlet and outlet passageways for the purpose of defining a gas flow route through said inlet passageway, down said outer annular chamber, through said internal passageway, up through said central chamber, and out through said outer passageway respectively.
    input means for introducing carbon monoxide into said inlet passageway,
    output means for receiving carbon monoxide from said outlet passageway, and
    recycling means for returning a portion of said carbon monoxide from said output means to said input means.

2. The apparatus of claim 1 wherein said output means further includes a desulfurizing means for recovering sulfur from said output carbon monoxide and a power generating means for retrieving power therefrom.

3. The reactor of claim 1 and including a diametric wall extending across said inner and outer shells and dividing said annular chambers in half.

4. The reactor of claim 1 wherein each of said inner and outer shells comprises inner and outer spaced walls.

5. The reactor of claim 1 and including heat exchange conduits in said inner and outer shells.

6. The reactor of claim 1 including a refractory lining on the surfaces of said inner and outer shells in said chambers.

* * * * *